United States Patent
Stuth et al.

(10) Patent No.: US 12,091,720 B2
(45) Date of Patent: Sep. 17, 2024

(54) METHOD FOR PRODUCING A RAW WIRE FROM A FIRST METAL STRIP AND AT LEAST ONE FURTHER METAL STRIP BY ROLL PROFILING

(71) Applicants: Theodor Stuth, Neuss (DE); Andreas Mols, Wickede (DE)

(72) Inventors: Theodor Stuth, Neuss (DE); Andreas Mols, Wickede (DE)

( * ) Notice: Subject to any disclaimer, the term of this patent is extended or adjusted under 35 U.S.C. 154(b) by 371 days.

(21) Appl. No.: 17/290,925

(22) PCT Filed: Nov. 15, 2018

(86) PCT No.: PCT/EP2018/000513
§ 371 (c)(1),
(2) Date: May 3, 2021

(87) PCT Pub. No.: WO2019/057335
PCT Pub. Date: Mar. 28, 2019

(65) Prior Publication Data
US 2021/0371946 A1    Dec. 2, 2021

(51) Int. Cl.
*C21D 8/06* (2006.01)
*C21D 8/02* (2006.01)
(Continued)

(52) U.S. Cl.
CPC .......... *C21D 8/065* (2013.01); *C21D 8/0205* (2013.01); *C21D 9/525* (2013.01);
(Continued)

(58) Field of Classification Search
CPC ...... C21D 8/065; C21D 8/0205; C21D 9/525; C21D 2211/001; C21D 2211/005;
(Continued)

(56) References Cited

U.S. PATENT DOCUMENTS 3,940,964 A     3/1976  Todoroki et al.
4,048,705 A  *  9/1977  Blanpain ............ B23K 35/0266
                                                    228/56.3
(Continued)

FOREIGN PATENT DOCUMENTS

DE    19916234 A1 *  9/2000  ............... B22D 1/00
FR    2974528 A1    11/2012
(Continued)

OTHER PUBLICATIONS

Machine Translation of DE-19916234-A1 (Year: 2000).*

*Primary Examiner* — Keith Walker
*Assistant Examiner* — Ryan L Heckman
(74) *Attorney, Agent, or Firm* — Norris McLaughlin, P.A.

(57) ABSTRACT

A method for producing a feedstock wire is produced from a first metal strip and at least one further metal strip by roll forming, wherein in particular the first metal strip and the at least one further metal strip are made of differing metals, preferably of differing meals having differing yield points, wherein a jacket, which in the final shape completely surrounds the at least one further metal strip in the circumferential direction, is formed from the first metal strip in a plurality of passes by roll forming using a plurality of roll stands, and wherein, first, exclusively only the first metal strip is formed to a preliminary shape in a plurality of passes using a first group of roll stands and, thereafter, the first metal strip and the at least one further metal strip are jointly formed to the final shape in a second group of roll stands.

23 Claims, 4 Drawing Sheets

(51) Int. Cl.
 *C21D 9/52* (2006.01)
 *C22F 1/04* (2006.01)
(52) U.S. Cl.
 CPC .. *C21D 2211/001* (2013.01); *C21D 2211/005* (2013.01); *C22F 1/04* (2013.01)
(58) Field of Classification Search
 CPC ............... C22F 1/04; Y10T 428/12222; Y10T 428/12292; Y10T 428/12299
 See application file for complete search history.

(56) References Cited

U.S. PATENT DOCUMENTS

| | | | |
|---|---|---|---|
| 4,203,188 A | 5/1980 | Blanpain et al. | |
| 9,833,823 B2 | 12/2017 | Sprock | |
| 2010/0047616 A1* | 2/2010 | Urevich | B23K 35/406 |
| | | | 428/650 |
| 2015/0159251 A1* | 6/2015 | Hentschel | C22C 21/06 |
| | | | 148/552 |
| 2019/0061044 A1* | 2/2019 | Jeong | B23K 9/232 |

FOREIGN PATENT DOCUMENTS

| | | |
|---|---|---|
| JP | S50-160149 A | 12/1975 |
| RU | 2635500 C2 | 11/2017 |
| UA | 864 A1 | 12/1993 |

* cited by examiner

METHOD FOR PRODUCING A RAW WIRE FROM A FIRST METAL STRIP AND AT LEAST ONE FURTHER METAL STRIP BY ROLL PROFILING

The invention relates to a method for producing a feedstock wire from a first metal strip and at least one further metal strip by roll forming, wherein a jacket, which in the final shape surrounds, and preferably completely surrounds, the at least one further metal strip in the circumferential direction, is formed from the first metal strip in multiple passes by roll forming using multiple roll stands.

Preferably, it is provided that the first metal strip and the at least one further metal strip are made of different metals. It is further preferable for the different metals have differing yield points. The yield points of the different metals preferably differ by a factor of at least 2, more preferably by a factor of at least 3, and still more preferably by at least a factor of 4.

Such a feedstock wire should preferably be usable as a filler wire or a thermal spray wire. The metal strips are preferably unwound from coils. The feedstock wire is produced by roll forming strips. Roll forming is also referred to as roll profiling. In the process, metal strips are guided between profiled rollers, whereby the profile shape is applied to the metal strips. According to the invention, the metal strips having the preferably differing yield points are separately introduced into the roll forming process. The metal strip used as a jacket is wider than the at least one other metal strip and, prior to the deformation of the at least one other strip having preferably, in general, a lower yield point, is pre-formed alone, and in particular is inwardly deformed to approximately the final shape. The feedstock wire produced according to the invention can be reduced to a desired final dimension, for example by way of hammering, rolling, stretch reducing and/or drawing.

A nickel strip can preferably be used as a strip having the higher yield point, and an aluminum strip can preferably be used as a strip having the lower yield point. In this case, a pure grade having a reduced carbon content is preferably used for the nickel strip, which allows the NiAl composite to undergo recrystallization annealing. NiAl spray wires are used for high-temperature resistant coatings, for example, such as a bond coat during the production of turbine blades.

Introducing the strip having the lower yield point into the roll forming process with delay prevents this strip from being elongated compared to the other strip, and thus prevents the risk of this strip being pushed out of the resulting wire and of creasing forming in this strip. The preferred coiled material processing method allows for the production of long running lengths. This prevents the strip having the lower yield point from being pressed out of the feedstock wire during calibration and further deformation. To enable stronger deformation of the material having the lower yield point, clearances are provided, by a limitation of the width of this strip, which are filled by transversely flowing material, or the like.

PRIOR ART

Roll forming is a pure forming process, using bending, for a single metal strip. If multiple metal strips are to be processed together, clad metal strips are processed according to the existing prior art, which largely behave like a single strip.

Considerable problems arise when unbonded, layered metal strips are to be roll formed together, in particular when these metal strips have differing widths. The core of the problems is the differing yield points of different metals, which in the case of unbonded joint processing results in relative movements, and in particular in differing elongations of the different metal strips.

The yield point shall be understood to mean a material characteristic that denotes the stress up to which a material, with single-axis and moment-free tensile loading, does not show any permanent plastic deformation, which is to say, when a drop below the yield point occurs, the material elastically returns to the original shape thereof after removing the load, and when the yield point is exceeded, a change in shape remains, which is to say lengthening in the case of a tensile test.

Thus far, no solution exists for the problem related to elongation. It is even more problematic, when roll forming metal strips, to produce a completely filled wire-shaped cross-section, of which the outer jacket is made exclusively of one of the composite partners.

The publication U.S. Pat. No. 3,940,964 teaches the use of a clad tape made of layers having identical widths for the production of a rod-shaped body. This primary material cannot be used to produce a completely filled profiled and, at the same time, a wire that is clad on all sides. This is also not the express purpose of the teaching of this publication.

Furthermore, US 2010/0047616 A1 describes the production of a bimetal wire from two layered strips, in which, in the produced final shape, one metal strip forms a jacket that completely surrounds the other metal strip. It is provided in this document to place an aluminum strip onto a wider nickel strip, to initially deform both strips together, from the start, in a U-shaped manner, and to then fold the portions of the nickel strip that project in the width direction (perpendicular to the longitudinal direction) over the ends of the aluminum strip and to continue to roll form these. The feedstock wire thus produced is then further drawn to form a wire having a thinner cross-section.

The method described in US 2010/0047616 A1 has the following shortcomings:

1. Mixing proportion of aluminum and nickel

According to US 2010/0047616 A1 [0014], the nickel and aluminum components should be distributed approximately equally in the cross-section and have the same volume. Aluminum and nickel, however, must be present in the cross-section of the wire in a proportion as is required by the alloy resulting from thermal spraying/welding/fusion.

A composition of 80 wt. % Ni/20 wt. % Al is standard for the NiAl alloy. The weight ratio must be converted into surface area dimensions of the strips. This, however, is not described in the publication.

2. Differing elongations of jointly processed different metals due to the differing yield points thereof a. Strip Infeed It is provided in US 2010/0047616 A1 to deform aluminum and nickel jointly from the start, either as a layered [0015] and [0016] or a clad [0022] material. The two metals, however, have differing strengths: The yield point of soft-annealed nickel of the standard grade UNS N02200 is 100 MPa, while that of soft-annealed aluminum ENAW 1050 is 20 MPa.

Even though it is primarily the cross-section that is deformed in a defined manner during roll forming, a perpendicularly acting minimum pressure has to be exerted in the thickness direction on the metal strip so that the strip can be guided in a stable manner. The required roll pressure is dependent on the material: pressure that is sufficient to guide nickel in a stable manner already results in a thickness reduction of aluminum, which is softer. During roll forming, the energy that is required for the desired material deformation is transmitted from the working rolls via the tools (rollers) to the metal strip by way of pressure. This means that the pressure between the upper and lower tools and the metal strip has to be great enough that the material of the metal strip is pulled into the tools, and can be deformed at the desired deformation points beyond the yield point thereof.

If two or more layered metal strips having differing yield points are now deformed, the deformation energy to be introduced can only be as high as the strength of the material of the metal strip having the lowest yield point allows.

In a transition region between the tool pressure that can still be applied to the softer material and the pressure that must be simultaneously achieved for deforming the harder material, the thickness of the softer material would be reduced and continuously elongate or gather in front of the tool.

However, if the softer material is no longer able to transfer the necessary deformation energy for the harder material, the thickness thereof would be drastically reduced and this would be sacrificed. The friction between the tool and the metal strip would be lost, and the rolling process would come to a halt. The tool rollers would slip on the "stationary" composite.

When rolling metal strips, thickness reduction substantially does not manifest as a change in width; rather, the displaced material causes a change in length of the metal strip. Changes in length of jointly processed layered metals having differing strengths result in the softer material being squeezed out, or in the formation of creasing (doubling) in the softer strip. Creasing makes the deformation intended in the downstream roll stands impossible. Both phenomena prevent a desired mixing proportion from being adhered to, since this necessarily changes in the cross-section as a result of the material displacement.

So as to avoid the effects of differing changes in lengths, the aluminum strip can be decelerated at the infeed into the roll forming system or placed under tensile stress. Pull-back, however, can only be applied in front of the infeed into the first roll stand. While doubling in the first roll stand is thus prevented, differing changes in length can no longer be compensated for in the other stands. As a result, there is a risk that the differing changes in length that occur in the two strips during roll forming result in overlaps of the softer material. Both differing changes in lengths and overlaps change the mixing proportion between aluminum and nickel in the cross-section, and a wire having incalculably fluctuating mixing proportions cannot be used for the intended purpose.

A solution for avoiding differing elongations of nickel and aluminum likewise does not result from, as is described in [0016] and FIG. 4, folding the projecting nickel sides over the aluminum strip, to thereby capture it. When the aluminum strip is clamped at an early stage of the roll forming process, the differing changes in length of nickel and aluminum result in tensile stresses which may be so great that the aluminum strip initially shows tension cracks, and ultimately tears. In risk assessment, it must be considered that the production of a feedstock wire requires, for example, 20 deformation stations.

b. Feedstock Wire

With a given pressure exerted on the composite of the two metal strips which exceeds the yield point of the softer metal, the softer metal and the different metal deform differently. This differing deformation is not avoided by producing a closed feedstock wire. According to US 2010/0047616A1 [0015], the two metals to be processed are to be layered. When metals are layered prior to starting the joint processing operation, the processable length is limited. Experiments conducted to produce feedstock wires having a length of 6 m showed that the aluminum inlay was pushed out of the feedstock wire end by between 7.5 and 11.5 cm. This changes the composition between Ni and Al in the feedstock wire to a significant and incalculable degree.

In contrast with that described in US 2010/0047616A1 [0018], the aluminum not only fills voids, but also elongates, especially counter to the processing direction.

3. Thickness of the Starting Material and Need for Process Annealing Steps a. Feedstock Wire Dimensions According to US 2010/0047616 A1

The feedstock wire produced by roll forming has a diameter of 6.35 to 7.62 mm (US 2010/0047616 A1 [0017]). It does not yet have a completely filled cross-section (see FIG. 5 in US 2010/0047616 A1) and has to be reduced to 2.381 mm to 3.175 mm by way of hammering, rolling or drawing, and thereby is consolidated (US 2010/0047616 A1 [0018]). A reduction in the diameter of approximately 50%, however, already results in a surface area reduction of more than 80%.

| Starting diameter mm | End diameter mm | (Surface area) Reduction mm |
|---|---|---|
| 7.62 | 3.18 | 82.58 |
| 6.35 | 2.38 | 85.50 |

The wire becomes harder as a result of the reduction. At a reduction of more than 80%, the deformability of the composite wire is exhausted. The composite wire is then so hard that the wire, at least in conventional devices, can no longer be fed through the cable-hose package of the welding device due to a lack of flexibility.

Even if a thermal spray wire, made of nickel and aluminum strips, according to the teaching of US 2010/0047616 could be produced, which is not the case, this could no longer be used for thermal spraying.

The wire becomes harder as a result of the consolidation of the feedstock wire and drawing to the final dimension. So as to render the wire usable, which is to say, to make it soft, the wire would have to be annealed. Annealing, however, is not provided for in US 2010/0047616 A1, for good reason.

The recrystallization temperature of nickel (690° C. to 720° C.) exceeds the melting temperature of aluminum (650° C.). As soon as molten aluminum comes in contact with nickel, an exothermic reaction is triggered, which causes the composite to be heated to such an extent that the nickel also melts. The composite wire according to US 2010/0047616 A1 can thus not be soft annealed.

b. Feedstock Wire Having a Lower Thickness

In the experience of the inventors, the cross-section of the feedstock wire only has to be 20% greater than the completely filled dimension that is consolidated by calibration and reduction. The high reduction percentages that result from the description in US 2010/0047616 A1 [0017] and [0018] are not necessary when thinner starting strips are used and thereby, preferably, recrystallization annealing can be avoided.

The horizontal cross-section of the wire shown in FIG. 1 of US 2010/0047616 A1 is composed of 10 layers that are arranged in a bilateral-symmetrical manner and have approximately the same thickness: 6 made of Ni and 4 made of Al.

Assuming that all layers have the same thickness, the thickness of the starting material results from:

| Final dimensions of thermal spray wires | | Reduction in cross- section Required % | Feedstock wire dimensions | | Layer thickness | |
|---|---|---|---|---|---|---|
| Diam- eter mm | Surface area mm² | | Diam- eter mm | Surface area mm² | Thick- ness mm | Reduc- tion % |
| 1.6 | 2.01 | 20 | 2.0 | 3.14 | 0.2 | 56.25 |
| 2.38 | 4.448 | 20 | 2.975 | 6.95 | 0.2975 | 56.25 |
| 3.2 | 8.04 | 20 | 4.0 | 12.57 | 0.4 | 56.34 |
| 6.4 | 32.17 | 20 | 8.0 | 50.27 | 0.8 | 56.60 |

However, even the use of thinner metal strips does not solve the problems.

The metal strips must not be too thin. For stable strip guidance in roll forming stands, a certain minimum thickness is required for the metal strip. The minimum thickness is material-dependent, and is approximately 0.2 mm for steel, and more for softer materials. Layered metal strips are not assessed based on their overall thickness, but based on the individual thicknesses, since layered metal strips behave in the same way as the individual strips of which the layer stack is composed. This is due to the fact that layer stacks behave like individual strips as long as they are able to be displaced with respect to one another.

The use of thin metal strips, however, is not only technologically complex, it is also not economical since, first, thin starting strips have to be rolled, and then large lengths have to be roll formed. Reducing a composite composed of thicker metal strips by way of rolling or drawing, by comparison, is considerably less expensive, and such operations are necessary for consolidation anyhow.

A wire having a diameter of 1.6 mm thus cannot be produced by roll forming. All wires that have a larger diameter can be produced by roll forming; however, the approximately 56% reduction makes these too hard to be fed through a cable-hose assembly in the preferred application. It must be taken into consideration that inwardly bending the protruding portions of the nickel strips causes webs to arise in the wire interior, as a result of which the composite wire is considerably more difficult to bend than a solid wire of equal thickness.

4. Since aluminum is intercalated in the strip ends made of nickel that are turned inward in a hook-shaped manner, the center of the wire is not solely made of nickel.

According to US 2010/0047616, FIG. 1, the portions of the nickel strip projecting in the width direction are bent back onto the inserted aluminum strip so as to clamp the same. As a result of early clamping, before the processing of the jacket has been completed, the aluminum strip is subjected to shear stress and may tear. As a result, the composition in the cross-section changes.

5. The cross-section shown in FIG. 1 of US 2010/0047616 cannot be produced as described by roll forming.

FIG. 5 of US 2010/0047616 shows a profile that is already closed and that can no longer be refined by roll forming to form the profile shown in FIG. 1, since the profile rollers can then only act from the outside for the further deformation. To be able to produce the cross-section shown in FIG. 1, the outer edges of the nickel strip, proceeding from FIG. 5, would additionally have to be angled by 90° in the profile that is already closed. This is not possible with roll forming. Rather, when pressure is applied from the outside, the outer edges of the nickel strip will dig into the aluminum layer, and shear off the aluminum.

The feedstock wire profile according to FIG. 1 to be produced by roll forming also cannot be produced from FIG. 4, since the outer strip cannot be rolled in by 90°, let alone, as is necessary, by 180°; the counter support from inside needed for inward deformation is absent.

Using the method described in US 2010/0047616 A1, it is thus not possible to achieve the object thereof; however, the basic idea of producing a feedstock wire from strips represents an approach that is refined by the present invention.

Objective

If strips that have a width measuring several times the thickness thereof, in particular, at least 5 times, and more preferably, at least 10 times the thickness thereof, are deformed by perpendicularly acting pressure, this deformation almost exclusively results in changes in length, and not in changes in width. So as to produce a wire having a defined composition made of two or more metal strips, and in particular metal strips having differing yield points, the relatively greater elongation of the metal strip having the lower yield point is to be avoided.

It is thus an object of the invention to reduce, and preferably to avoid, greater elongation of one of the metal strips in relation to the other of this sort.

Further preferably, a method for producing a feedstock wire is to be provided, in which a feedstock wire is created, the core of which is, at least predominantly, made of the material that also forms the jacket of the feedstock wire.

In a preferred embodiment, furthermore a thermal spray wire to be produced from nickel and aluminum strips is to preferably also meet the following requirements:

The metals are not to be present in powder form, but in the form of strips.

To produce NiAl spray wire, aluminum powder is often added into a jacket made of nickel. Since the surface of powder is greater than the surface of strip, more oxide is incorporated by powder than by strip. The use of powder is therefore disadvantageous.

Aluminum powder is additionally pyrophoric as soon as the powder size drops below 500 μm.

Powder has the additional disadvantage of flowing, so that an exact composition of the cross-section comprising the jacket and added powder is difficult to control.

The strips are not to be introduced in the form of an alloy, but in the form of components of the alloy.

An alloy comprising 80 wt. % nickel and 20 wt. % aluminum melts at as low as 1,362° C., while nickel does not melt until 1,455° C. At first glance, it may therefore appear to be advantageous to use an alloy to serve as a thermal spray wire. The particular advantage of spraying a composite wire is that the exothermic reaction of Al with Ni only occurs during melting, directly during thermal spraying. The temperature, which is increased as a result, causes good bonding of the sprayed layer with the substrate. Pretreatment of the substrate so as to improve the adhesion may be dispensed with in some circumstances.

The differing strengths of nickel and aluminum must not result in differing elongations when these are processed to form a wire, and must not thus result in a change in the mixing proportion.

It should preferably be possible to subject the composite to recrystallization annealing The wire should preferably be dimensionally stable, which is to say it must not be so soft so as to break during feeding. On the other hand, it must not be so hard so as to make it impossible to feed. It should therefore be possible to set the hardness of the composite wire by deformation and annealing. During annealing, no exothermic reaction must occur.

Creation of the cross-section from nickel and aluminum layers

High surface roughness, such as that of, for example, aluminum, due to the oxide layer, results in rapid wear of the cable-hose package. For this reason, the outer layer of the composite wire should preferably be composed of nickel. The center of the wire should likewise be composed of nickel to avoid early clamping of the aluminum strip.

The profile cross-section should preferably be completely filled

In this preferred embodiment, no cavities are to remain because air would oxidize the bonded metals upon heating.

Terms

"Feedstock wire" denotes a composite wire that is made of at least two metal strips and produced by roll forming.

In the present interpretation, the term "nickel" denotes nickel grades having a degree of purity of at least 99.6 wt. % and a carbon content of no more than 0.02 wt. %.

The term "aluminum" also encompasses aluminum alloys, and in particular additions of rare earths, which promote high-temperature protection.

"W-profile" shall be understood to mean a cross-sectional shape of the metal strip in the cross-section perpendicular to the longitudinal direction, which resembles the letter "W."

In particular, this, when viewed from above, results from buckling, and in particular a convex inward deformation/of the metal strip, between two lateral upright legs of the metal strip.

DESCRIPTION OF THE INVENTION

According to the invention, the object is achieved, in the case of a production method of the type mentioned at the outset, by first exclusively forming only the first metal strip in multiple passes to a preliminary shape using a first group of roll stands and, thereafter, jointly forming the first metal strip and the at least one further metal strip to the final shape, in a second group of roll stands.

The invention, in this process, proceeds on the assumption that the forming operation of the at least two metal strips, which is to say the first metal strip and the at least one further metal strip, takes place with a plurality of passes, which are carried out by way of a plurality of roll stands, and in particular one roll stand in each case per pass.

According to the invention, the total number of all roll stands participating in the forming operation according to the invention is divided into two groups. A first group exclusively deforms solely the first metal strip, which later forms the jacket of the feedstock wire, and the second group of roll stands deforms all metal strips that form the feedstock wire, together. The at least one further metal strip is added to the first metal strip between the first and second groups. In terms of the process, the at least one further metal strip can be guided away from the coil via the first group of roll stands without processing, and then be introduced downwardly, and together with the first metal strip, into the second group. The coil for the further metal strip can also be positioned above the first group of roll stands, so that the further metal strip can be directly introduced into the first stand of the second group of roll stands. In both instances, the strip can expediently be guided over an S roll stand.

This separation makes it possible to exert, by way of the first group of roll stands, only such pressures on the first metal strip which, when exerted on the at least one further metal strip, would result in this at least one metal strip being elongated in relation to the first. The partial separation of the deformation steps thus avoids this elongation, which occurs, in particular, when metal strips having differing yield points are integrated into the feedstock wire.

The partial separation of the forming processes of the first metal strip alone and of the subsequent joint forming operation, however, is also advantageous when the metals have identical or similar yield points, since jointly processed strips can also be displaced with respect to one another in the case of identical or similar yield points. In addition, it is easier to inwardly deform the profile of the jacket separately.

Differing elongations of the strips occur when strips of differing strengths are processed jointly. According to the invention, the differing elongations of different metal strips, for example of nickel and aluminum, due to the differing strengths thereof, can be avoided by delaying the joint processing, and preferably not carrying this out until the second half of all of the processing stages, and in particular of all of the passes of the roll stands in the second group. For this purpose, in contrast to the teaching of US 2010/0047616 A1, the at least one further metal strip, and in particular the aluminum strip, is not already placed onto the first metal strip, and in particular the nickel strip, before the first pass, but is placed only several passes later, and in particular as many passes later as possible, into the first metal strip, preferably the nickel strip, which, in the cross-section, has already been formed to the preliminary shape, preferably in a trough-shaped design. The preferably stronger first metal strip is thus initially deformed alone, separately from the second metal strip.

The circumstance that metals that have a lower yield point deform more than those that have a higher yield point at the same pressure, or deform at lower pressures, is due to physical reasons and cannot be avoided when these are processed jointly. The invention thus provides for separation of the processing stages of the different materials of the metal strips.

Prior to producing the composite from the differing materials, the metal strip forming the jacket, in particular the stronger metal strip, and preferably the nickel strip, is thus separately deformed according to the invention, namely by way of the first group of roll stands.

In a preferred embodiment, the invention provides that a trough shape is formed of the first metal strip, seen in the cross-section perpendicular to the longitudinal direction of the metal strip, by way of the roll stands of the first group for forming the first metal strip to the preliminary shape, in particular having lateral trough-shape legs and a trough-shape bottom connecting these. The trough shape is seen in the cross-section perpendicular to the longitudinal direction of the metal strip. The trough shape can also essentially be understood to mean, in particular a modified U shape.

Accordingly, this embodiment provides that the at least one further metal strip is inserted into the interior of the trough shape, in contact with the bottom region of the trough shape, whereupon the first metal strip and the at least one further metal strip can be jointly formed, in clamping connection with one another, by the second group of roll stands.

The clamping can, for example, take place in that the at least one further metal strip that is inserted is pushed onto the bottom region of the trough shape by way of at least one roll of the respective roll stand. The clamping can also, in particular subsequently, take place by the at least one further metal strip being held in a clamping manner by the first metal strip.

The trough shape forms an open preliminary shape of the jacket of the feedstock wire, which is later closed, whereby it is apparent that, with this embodiment, the creation of the jacket is already completed to a large degree before the at least one further metal strip is introduced into the forming process.

In this regard, the invention can preferably provide that the trough shape is formed by forming the, preferably initially planar, first metal strip by bending each of the two strip edges of the first metal strip, which are located opposite one another (in the width direction of the metal strip), 180 degrees onto the surface of the metal strip, and in particular by crimping the strip edges. The strip edges are thus essentially bent back onto themselves. Preferably no distance/cavity results in the process between the bent regions of the strip edges, which make contact with themselves. The bent strip edges thus preferably have double the original thickness of the metal strip.

The trough forming furthermore takes place by forming two upright legs by bending each of the two lateral regions of the first metal strip that are located opposite one another (in the width direction), in particular 90 degrees plus/minus 15 degrees out of the original metal strip plane, wherein the two legs form lateral outer walls of the trough shape, and a region connecting the legs forms a bottom of the trough shape.

The two forming steps described here can be carried out in any arbitrary sequence, however it is preferred that the "bending onto themselves" of the strip edges is carried out first.

The width of the fold of the strip edges on both sides by 180° onto themselves defines the core volume of the feedstock wire that is desired later and formed by the jacket material, in advance.

The subsequent vertical orientation of the strip edges to form upright lateral legs, in particular by preferably another 90°, forms the aforementioned trough, in the cross section perpendicular to the longitudinal extension, in which the second metal strip can be inserted. In particular including the subsequent inward deformation of the trough flanks/legs, and this already approximately corresponds to the final geometry of the feedstock wire.

The second metal strip, preferably the aluminum strip, is preferably only inserted into the first metal strip that has been bent to a trough shape, and more preferably shaped into a W, before the trough legs are bent in the direction of the trough interior.

Based on the exemplary embodiment shown in the figures, in FIG. 1 the at least one further metal strip, preferably the aluminum strip, is only joined in station 11 into the first metal strip, preferably the nickel strip profile, that has already been formed to a trough shape. Since the first metal strip, in particular the nickel profile, has essentially been fully rolled and, here, preferably been inwardly deformed to a W shape, no high forces need be exerted on the at least one further metal strip/aluminum strip for strip guidance, which would reduce the thickness thereof and disproportionately elongate the same.

Technically, the delayed feeding of the at least one further/second metal strip, in particular, of the aluminum strip, can be effectuated by positioning the discharge with the aluminum strip above the roll forming system (see FIG. 1). The strip unwound from this coil is preferably introduced from above into the roll forming process in an S-shaped path via rolls. The uncoiler can also be positioned in front of the coil from which the first metal strip, in particular the nickel strip, is unwound.

The invention can furthermore provide a limitation of the vertical roll pressure that is required for strip guidance while feeding the at least one further/second metal strip, in particular the aluminum strip.

It may be provided that the at least one further/second metal strip, in particular the aluminum strip, is prevented from yielding transversely to the course of the strip.

For this purpose, the invention can provide that the at least one further metal strip, and in particular the second metal strip/aluminum strip, is centered by a tool roll disposed thereabove when being fed into the trough shape, the at least one further metal strip being essentially only guided laterally, which is to say being only centered with such a pressure on the first metal strip/nickel strip that does not cause any elongation of the at least one further metal strip.

In the process, this may be inwardly deformed in a convex manner by the first metal strip/nickel strip, provided the preferred W shape is present in the first metal strip, which is described hereafter, but this is not absolutely essential.

Elongation of the at least one further metal strip, in particular of the aluminum strip, while this is being fed and centered, is thus entirely avoided.

Strips are characterized by a high width to thickness ratio. If pressure is exerted on strips, the perpendicularly acting forces result in elongation. The width changes, at most, minimally. When two strips having differing yield points are processed jointly, the softer strip elongates more than the harder strip. In contrast to FIG. 4 of US 2010/0047616 A1, the invention thus provides that the at least one further metal strip, preferably the aluminum strip, is therefore only clamped in the roll forming process after the preliminary shape of the first metal strip has been formed, and thus, in particular, is not clamped prematurely; in this way, it is possible to avoid what otherwise would be excessive forces in the longitudinal direction, which otherwise could result in the at least one further metal strip, and preferably the softer aluminum, being sheared off.

So as to achieve the intended final shape, the invention provides that the first metal strip, preferably the nickel strip, is pressed onto the second metal strip, preferably the aluminum strip. For this purpose, the legs of the trough formed of the first metal strip are bent in the direction of the trough interior, and thereafter, with the strip edges that are bent back onto themselves, make contact with the outer strip regions of the at least one further metal strip. The at least one further metal strip, in particular the aluminum strip, is clamped by the inwardly folded strip edges of the first metal strip, in particular of the nickel strip, and is thereby fixed with a centered orientation. Preferably, the invention thus allows for, as a result of the clamping, the first metal strip also assuming strip guidance of the at least one further metal strip, and in particular of the second metal strip, and the pressure exerted by the tool rolls at least substantially acting only, or at least predominantly, on the first metal strip.

The invention can prevent material of the at least one further metal strip, preferably aluminum, from being squeezed out of the feedstock wire.

The above-described techniques for preventing a disproportionate elongation of the at least one further metal strip, in particular of the aluminum strip, compared to the first metal strip, in particular the nickel strip, cease to be effective when a closed wire profile has been reached, and in particular when uniform pressure is already exerted from all sides on the feedstock wire produced according to the invention for preferably subsequent calibration of the feedstock wire. With a given pressure exerted on the composite, which exceeds the yield point of the softer metal, the metals of the two strips, in particular of Ni and Al, deform differently. The differing deformation almost exclusively manifests itself in differing elongations in the given strip dimensions. These differing elongations are not avoided by the feedstock wire already having a closed profile. Despite clamping of the at least one further metal strip, in particular of the aluminum strip, by the first metal strip, this is pressed out of the wire end during deformation of the composite wire. In the case of aluminum and nickel, the softer aluminum can thus be pressed out of the wire end 7.5 to 11.5 cm during the deformation of the composite wire, in the case of rods up to approximately 6 m long.

The invention can be such that a bulge, preferably a convex bulge, directed into the interior of the trough shape, if formed in the bottom of the trough shape, in particular for creating a W-shaped trough shape. In this embodiment, the at least one further metal strip, which is inserted into the trough in a centered manner with contact with the bottom of the trough shape, can then be bent over the convex bulge. In this way, centering of the at least one further metal strip in the trough shape of the first metal strip is ensured.

Such a convex inward deformation of the two strips, in particular of the nickel and aluminum strips, initially appears to be counter-intuitive since the composite strip has to be concavely inwardly deformed to achieve a wire-shaped cross-section. In US 2010/0047616 A1, the profile is thus directly inwardly concavely deformed in an obvious manner (see [0016] and FIG. 3).

The W-shape is preferably created by a temporary inward convex deformation/bulge of the trough bottom of the metal strip that forms the jacket, in the region between the lateral legs.

The use of the W-shape initially appears to be disadvantageous for the production of the feedstock wire, for two reasons:

To carry out the W-shaping, at least two additional roll stands, in particular break-down stands, are required. The additional stand and tool costs make the roll forming process expensive.

As a result of alternate bending, the metal strip is cold-work hardened to a greater degree. In this way, the overall deformation potential is exhausted at an earlier stage, and earlier, or even additional, annealing may become necessary.

For producing the composite wire, W-shaping is, in fact, not required in terms of the necessary lateral forces, and for the reasons mentioned above, one would therefore dispense with this. In principle, the composite wire can also be produced using a planar bottom for the metal strip that has been formed into a trough and forms the jacket.

The W-shaping can preferably be used during the production of the composite wire, but is not mandatory. Further preferably, the second metal strip, in particular the aluminum strip, is likewise inwardly deformed in a convex manner, above the convexly inwardly deformed first metal strip (jacket strip). For this purpose, the second metal strip can be placed on the bulge in the trough of the first metal strip which effectuates the W shape, and the sides of the second metal strip can be pushed down, thereby resulting in the convex inward deformation of the second strip as well. The convex inward deformation is preferably carried out by a roll engaging from above, see FIG. 3, pass 11. This not only results in centering the second metal strip, and in particular of the aluminum strip, but also prevents this strip from being laterally displaced in the subsequent forming stages. Since only low bending forces are required, it is possible to avoid a relatively greater elongation of the at least one further/second metal strip, and in particular of the aluminum strip.

In principle, the method according to the invention can also be carried out without this W-shaping.

The invention preferably provides that the legs of the trough shape of the first metal strip are folded inwardly onto the surface of the at least one further metal strip, and in particular that the at least one further metal strip, in the lateral regions thereof, is contacted in a clamping manner by the bent strip edges of the first metal strip.

Thereafter it may be provided, for the purpose of creating the at least one closed jacket, that the outer surfaces of the legs of the trough shape are brought in contact with one another in several passes, in particular by concave inward deformation/circular bending of the trough-shape bottom, relative to the trough-shape interior, and the at least one further metal strip is clamped between the trough-shape bottom and the trough-shape legs.

In a particularly preferred embodiment, the invention is such as to prevent the material of the second metal strip, in particular of the aluminum strip, from being displaced/pressed out by way of a further advantageous refinement, preferably so that the composition of the cross-section does not change. Feedstock wires thus produced can then particularly preferably be utilized for the critical application of thermal spraying/welding.

For this purpose, the invention can be such that each of the metal strips is unwound from a coil, and the feedstock wire is wound to form a coil. As a result of processing coils, it is possible to implement long running lengths. The processing from coil to coil particularly advantageously means that material displacement in the longitudinal direction is suppressed.

The description of the starting material in [0015] of patent application US 2010/0047616 A1 teaches that rod-shaped material is to be used, and the materials to be bonded are not to be unrolled from a coil: "flat strips . . . , both of equal length, are brought together face-to-face to provide a laminate."

In this preferred refinement, the invention is such as to prevent a displacement of the material of the at least one further metal strip, in particular of the second metal strip, and in particular of the aluminum in the composite, by limiting the longitudinal flow of this material. If, according to the invention, coils are used, instead of several meter long strip sections, at least in the case of the at least one further metal strip, and preferably in the case of all the metal strips, which are processed to form the feedstock wire, the frictional resistance of the at least one further metal strip, in particular of the aluminum at the layers of the first metal strip, and in particular the nickel layers, in the subsequent wire lengths becomes so high that the material of the at least one further metal strip cannot be elongated to a greater extent than the first metal strip.

It is therefore expedient not to produce the composite wire in the form of a rod, but in the form of a coil, and preferably in the form of two coils of the two starting strips, or a corresponding number of coils of all the starting strips, to form a coil of the feedstock wire produced. Here, the invention may furthermore provide that the metal strips of consecutively used coils are bonded, and in particular welded, whereby continuous endless production of the feedstock wire becomes possible.

The invention can furthermore provide that the width of the at least one further metal strip is dimensioned so that a clearance, which can be closed, or closes, as a result of material flow, is created between the respective outer strip edge of the at least one further metal strip and the lower end of the leg of the trough shape. The invention thus deliberately provides empty spaces/clearances, which allow material to flow therein.

If the cross-section of the profile is heavily deformed, with the longitudinal flow being impaired by the material of the at least one further metal strip, the profile nonetheless expands to a greater extent than the material of the first metal strip. In a preferred refinement, the invention is thus such that clearances are provided for the material of the at least one further/second metal strip, into which the material is able to expand, despite clamping, perpendicularly to the processing direction or longitudinal direction. Perpendicular and, in the process, preferably horizontal, expansion is not critical since this does not change the mixing proportion across the cross-section.

In US 2010/0047616 A1 [0018], the flow of aluminum is used to fill existing gaps. However, so as to enable transverse flow in the first place, the invention preferably provides the creation of gaps or clearances. Initially, it is counter-intuitive to create empty spaces when these have to be closed again in later processing steps.

According to the invention, however, these empty spaces prove to be advantageous in allowing material to flow transversely to the processing direction. As a result of allowing a controlled transverse flow, expansion of the material of the at least one further metal strip can thus be translated into transverse flow, instead of longitudinal flow, and the profile is thus advantageously prevented from rupturing.

Preferably, clearances are provided, the entire surface area of which in the feedstock wire accounts for 5% to 20%, preferably 9% to 14% of the cross-section of the at least one further, and in particular second, metal strip.

For example, for Ni/Al, but also for different combinations, the lower limit can be calculated from the Ni and Al surface areas and the surface are of the feedstock wire, and the upper limit can be ascertained by measurement.

To create empty spaces, the at least one further metal strip is selected, in terms of the width thereof, so as not to extend into the corners, or to the lower leg ends, of the inwardly bent first metal strip, which is to say so as not to completely fill the profile. In addition, bending the first metal strip back onto itself at the edges causes doubling of the metal layer of the first metal strip thus generated, which act in a manner similar to a spacer, creating empty spaces for the metal of the second metal strip, and in particular empty spaces in the height of the material thickness of the first metal strip.

The metal of the at least one further/second metal strip can now propagate, despite clamping by the first metal strip, because elongation is blocked. In this way, the cross-section is filled completely. The permitted propagation of the second metal strip preferably fills the clearances in the cross-section completely.

As a result of the invention, the mixing proportion of the metals across the cross-section is thus preserved in the case of the two different metal strips, despite differing yield points.

The invention can be such as to create an intermetallic phase between the metal strips by annealing.

An intermetallic phase can regularly be observed when annealing clad strips. During the first recrystallization annealing process of the composite wire, no mixed crystal layer develops at that point, due to a lack of a metal-to-metal bond between the layers. A metal-to-metal bond is also not established during the second recrystallization annealing process, despite the reduction and compression of the composite by drawing. This may, in particular, be due to a low annealing temperature of 400° C. and a short holding period of 1 hour. At higher temperatures and longer holding periods, an intermetallic phase of the two metals, for example an approximately 4 μm thick intermetallic phase made of nickel and aluminum, can be created, which dissolves the layers by alloying at the interfaces. In this way, the layers are "adhesively bonded." Additionally, this makes it more difficult to press out the material of the at least one further/second metal strip during further processing. The creation of mixed crystal layers, however, may be undesirable. By selecting the annealing regimen, the user can decide whether a mixed crystal layer is to develop or whether the development thereof is avoided.

The invention can also provide that the material having the high yield point is packed into the material having the lower yield point, which is to say that the latter forms the jacket.

In the description thus far, it has been assumed that the material having the lower yield point preferably does not form the jacket, but rather the interior of the composite wire. The opposite case, in which the material having the higher yield point is enclosed by material having the lower yield point, is less critical since then the so-called sandwich effect comes into play. As a result of this, hard material, which is enclosed between soft material, can be rolled with lower force expenditure, and can be rolled out thinner without process annealing, than core material having the same thickness. The method according to the invention can thus also be carried out in this configuration of the materials.

In a preferred embodiment, the invention provides to completely fill the cross-section of the created feedstock wire.

Strips can be used to produce tubular cross-sections, but not wire-shaped cross-sections. While US 2010/0047616 A1, FIG. 1, shows a completely filled cross-section, this cross-section, as was shown above, cannot be produced by roll forming. To fill the cross-section completely, the invention is such as to bend the strip edges of the wider material, which serves as the jacket, by 180°, and to thereby bend this back onto itself, so that, after conclusion of the roll forming operation, a thickening, and preferably, to as great an extent as possible, a circular thickening, arises from the material of the jacket at the center of the wire. The degree of the overlap is variable, and the later core volume of the jacket material, in particular of the nickel, can be controlled exactly by the length over which the 180° fold is carried out.

For this reason, the invention also provides that the strips used for the composite do not have the same width.

Configuration of a wire cross-section suitable for the preferred application of thermal spraying Advantageously, both the center and the jacket of the composite wire are made of nickel.

When the nickel strip is first deformed onto itself, and not onto the aluminum, the entire center is filled with the material of the jacket after the inward deformation of the strips to form a wire.

So as to prevent the hard aluminum oxide from damaging the cable-hose assembly, it is expedient to also produce the jacket from nickel, and not from aluminum.

The deformability of the composite wire is exhausted after a surface area reduction of approximately 80%. In the case of a slightly oval feedstock wire, this corresponds to a width of 14 mm, a height of 13 mm, and a reduction in the cross-section of 57.5%.

If, in a refinement of the invention, the wire, produced by roll forming, and then further consolidated and reduced, is to be additionally reduced, it is preferably provided that a process annealing step is carried out.

In the preferred described application of nickel and aluminum in the case of two metal strips, however, the recrystallization temperature of standard grades of nickel is higher than the melting temperature of aluminum. The composite can thus not be soft annealed. To be able to anneal nickel-aluminum composites, the aluminum has to be alloyed with elements that increase the melting temperature of the aluminum. Silicon is such an element, for example. Such further alloying is technically feasible, however the produced wire is no longer suitable for the intended usage purpose due to the added alloying elements. As an alternative, the recrystallization temperature of the nickel used has to be lowered so as to preferably be considerably below the melting temperature of aluminum.

This condition is only met by high-purity nickel, having a degree of purity of at least 99.6% and a C content of no more than 0.02 wt. %. High-purity nickel having even higher degrees of purity (>=99.98%) recrystallizes at as low as 300° C. to 350° C., depending on the preceding deformation. If high-purity nickel having a degree of purity of at least 99.6% is used, recrystallization annealing of the composite wire is also possible in the invention.

A notch may remain in the feedstock wire that has been created by inward rounding of the first metal strip (see FIG. 4), in particular at the foot position of the two original trough legs. During further processing, oil used during drawing could penetrate into the notch and could coke during annealing. This would change the chemical composition of the composite wire in an undesirable manner.

The invention can thus be such as to close such a notch by welding.

For this reason, welding tests were conducted, with the goal of closing the walls of the notch. The notch was welded closed by way of a fiber laser, using core power of 1000 W, and ring power of 2000 W, with a focus position of 7.0 mm and advancement of 2.0 m/min. The welded seam withstands further deformation of the feedstock wire.

The invention can also be such as to decrease the notch by a cross-section reducing deformation of the feedstock wire.

If the feedstock wire is deformed further without welding the notch, the notch, with a reduction of the diameter from 13/14 mm to 10 mm, will draw together so as to be no longer visible to the naked eye. Welding of the notch can thus also be dispensed with. During extended storage at ambient temperature and high moisture, welding could be advantageous to prevent moisture from penetrating into the composite wire.

In a preferred embodiment, the invention can be such as to convert the ratios of the atomic weights of the materials involved, required in a feedstock wire, into surface area fractions of the metals within the feedstock wire cross-section, and then combine the metal strips according to the surface area fractions determined using the method according to the invention. This will be described in more detail hereafter based on the example of the preferred application of Ni/Al.

A composition of 80 wt. % Ni/20 wt % Al is standard for thermal spray wires. The invention preferably provides that this weight ratio is converted into the surface area dimensions of the strips to be stacked.

The following formula applies to volume fractions. Since the volume distribution across the length is constant, the ratio of the volume fractions also applies to the calculation of the surface. The following applies in the present case:

Formula:
G1=% by weight of component 1
G2=% by weight of component 2
R1=density of component 1
R2=density of component 2
V1=% by volume of component 1

$$V1 = G1*R2/(G1*R2+G2*R1)$$

Data:

| Material | Density g/cm$^3$ | Mass % wt % | Atom % at % |
|---|---|---|---|
| Aluminum | 2.7 | 20 | 35.2260 |
| Nickel | 8.91 | 80 | 4.7740 |

Calculation:

$$VAl = 20*8.91/(20*8.91+80*2.7) = 0.4521$$

Al=45.21%
Ni=54.79%

This surface area ratio can be achieved by multiple width and thickness combinations.

Ascertainment of the strip dimensions from the surface area fractions

From the desired feedstock wire diameter and the required surface area distribution, it is possible to calculate the thicknesses of the strips:

given:
DVwire=12.72 [mm] finished diameter of composite wire
pAl=2.70 [g/cm$^3$] density of aluminum
pNi=8.91 [g/cm$^3$] density of nickel
AAl %=45.21 [%] surface area fraction of aluminum in the composite wire
ANi %=54.79 [%] surface area fraction of nickel in the composite wire
sAL=2.40 [mm] aluminum strip thickness (selected)
sNl=1.20 [mm] nickel strip thickness (selected)
sought:
bAl=[mm]
bNi=[mm]
Calculation:

$$AVWire = (DVWire)^{2}*\pi/4 = 12^{2*}\pi/4 = 127.08\ [mm^2]$$

$$bAl = AVWire*AAl\ \%/100/sAl =$$

$$127.08*45.21/100/2.40 = 23.94\ [mm] = 24.00\ [mm]\ selected$$

$$bNi = AVWire*ANi\ \%/100/sNi =$$

$$127.08*54.79/100/1.20 = 58.02\ [mm] = 58.00\ [mm]\ selected$$

Field of Application of the Invention

While the invention was described in a preferred application in detail based on the example of the production of an NiAl wire because production problems are particularly great in this case, it is not limited to this combination of metals. It is also not limited to the softer material being located on the inside, and the harder material forming the jacket and the core. This may also be reversed. It is crucial to inwardly deform the jacket material to as great an extent as possible to form a preliminary shape according to the invention, before the second metal strip, and optionally further metal strips, are added to the roll forming process. Since only the pressure required for centering by the horizontal rolls is exerted on the metal strip that is inserted with delay, it is possible to insert not only one metal strip, but also multiple first metal strips, formed into a trough, and in particular even such that have differing yield points.

The use of the method is in particular advantageous:
- when certain alloys cannot be produced, or can only be produced with difficulty, by way of fusion metallurgy, for example because the alloying constituents tend to separate. The use of certain alloying components has to be limited
- when an alloy is difficult to process, for example because it becomes brittle during processing, or increases hardness quickly and therefore requires frequent process annealing. Processing the alloying components as layer materials, in contrast, may be much simpler.

In such cases, the alloy can be generated in near net shape by diffusion heat treatment. Diffusion can also be used to generate a gradient.

Different metal combinations can be processed according to the method principles described, for example:
austenitic-ferritic and so-called duplex steels.

Austenitic-ferritic steels (for example material no 1.4462) have a 2-phase structure. Austenitic-ferritic structures in which the two structural constituents are present in approximately equal parts are also referred to as duplex steels (for example, material numbers 1.4362, 1.4460, 1.4501). They combine the higher strength of ferritic chromium steels with the corrosion resistance of austenitic CrNi steels. Grades in which the structural constituents are not present in equal parts, in particular those having ferrite contents <25 wt. % and austenite contents <25 wt. % are difficult to produce. Billets having an austenitic-ferritic structure of this composition, which are produced by hot rolling, tend to crack at the corners. Cracks also form in the surface, originating from notches.

The yield point of ferritic steels is regularly higher than that of austenitic steels. A wire can thus be produced both with an austenitic jacket and a ferritic core, and with a jacket made of ferritic steel and a core made of austenitic steel.

The composite wire can be used as a filler wire.

FeCrAl alloys

The aluminum content of alloys produced by way of fusion metallurgy is usually limited to 5 to 5.6% because, the higher the aluminum content is, alloys having a higher Al content are more difficult to process. Using the novel method, it is also possible to produce wires having a higher aluminum content, for example 9%. This is advantageous since the aluminum reservoir is increased, and thereby the service life of the layers produced by welding is enhanced. If the composite wire is produced from stainless steel and aluminum strips, ferritic stainless steels, such as UNS S43000, UNS S43400 and UNS S44600, preferably having a limited sulfur content, can be used for the steel grades. The particular advantage of the method, including feeding of the alloying elements by way of separate strips, is that the difficult-to-process FeCrAl alloy is only generated at the end of the production process by diffusion annealing, or even only during the use as a filler wire.

FeNiCrAl and FeNiAl for example Cr26 Ni14 Al10 FeBal or, for example, Ni30 Al16 FeBal.

These material combinations are used to coat coal-fired power station boilers.

The wires produced according to the invention can be used not only as filler and thermal spray wires, for example for flame spraying, high-velocity flame spraying, arc coating and laser build-up welding, but also for melt treatment by wire injection. The wire can also be used to melt alloys that are very difficult to produce, for example nickel aluminides, in a modification of the arrangement of the feedstock according to the Exo-Melt process developed by the Oak Ridge National Laboratory. According to this process, the alloy is produced by reaction synthesis. A NiAl composite wire is particularly suitable for producing castings by melting.

Figure 1:
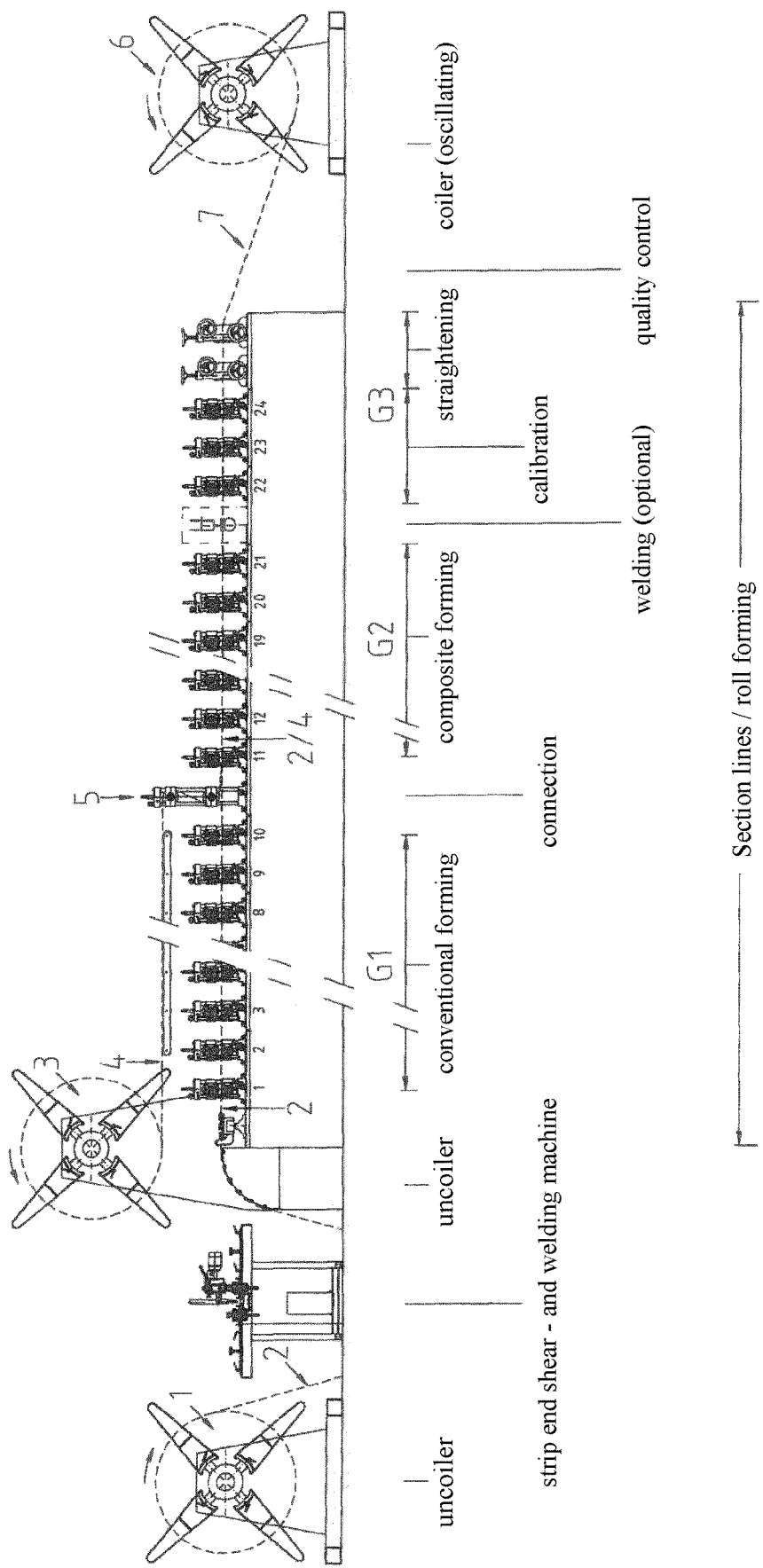
FIG. 1 shows the design of a roll forming system suitable for producing a feedstock wire.

From a coil 1, a first metal strip 2, which later forms the jacket, is feed to a first group G1 of roll stands here, which exclusively form only this first metal strip 2 to a preliminary shape, in particular, namely a trough shape. From a coil 3, a second metal strip 4 is guided past the first group G1 here, or guided across here, and introduced into the processing path using an S roll stand 5. Using the second group G2 of roll stands, the two metal strips 2 and 4 are then jointly deformed to the final shape according to the invention.

In this embodiment, an optional group G3 of further processing stations is also shown, by way of which the produced feedstock wire 7 can, for example, also be calibrated and/or straightened.

At the end of the processing section, the feedstock wire 7 produced according to the invention is wound on the coiler 6.

Figure 2:
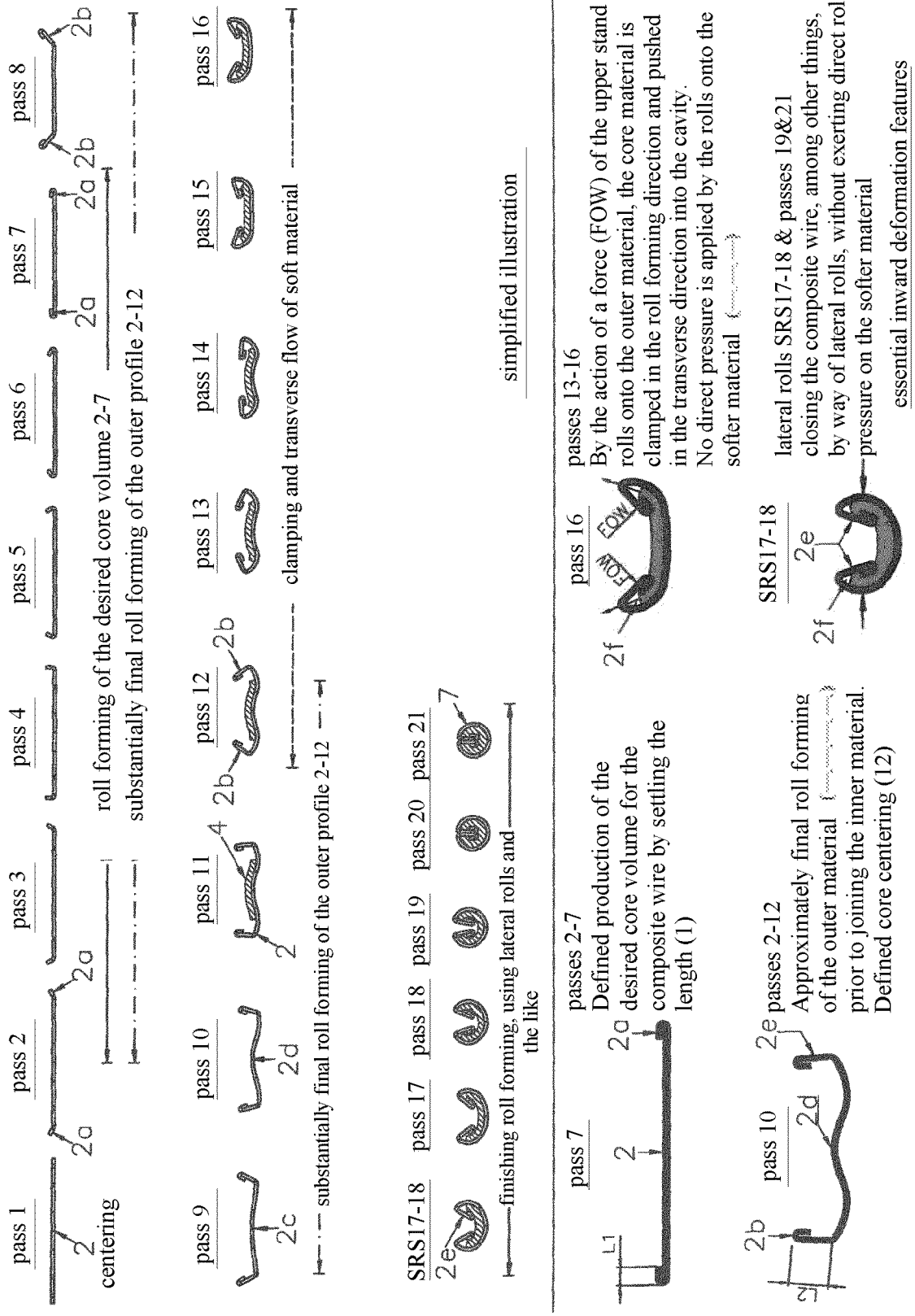

FIG. 2 shows the sequence of the deformation steps.

In pass 1, this being the first roll stand, the first metal strip 2 is centered. In passes 2 up to and including 7, the opposing strip edges 2a of the metal strip 2 are folded over 180 degrees onto themselves, so that here the material is thus doubled at the lateral strip edge.

In passes 8 to 10, the lateral trough legs 2b are created by vertically orienting the strip side regions. In this shown embodiment, the trough bottom 2c is furthermore provided with a bulge 2d that convexly extends upward into the interior of the trough shape, thereby generating a W shape of the trough shape.

Starting in pass 11, the second metal strip 4 is introduced into the processing path, centered, and bent over the bulge 2d of the trough shape.

In passes 12 to 14, the trough legs 2b are folded over toward the interior of the trough shape and onto the side regions of the second metal strip 4, whereby this second metal strip is connected in a clamping manner to the first metal strip.

In passes 15 to 21, the trough legs 2b, with the earlier outer sides 2e thereof, based on the earlier trough shape of passes 8 to 10, are deformed toward one another, and the clamped composite of the two metal strips is thereby inwardly rounded, wherein the bulge 2d is deformed back until, in pass 21, the outer sides make contact with one another, and the feedstock wire 7 according to the invention has been finished.

The enlarged illustration of the shape achieved in passes 16 and 18 furthermore shows a clearance 2f, which can be closed by material flow, between the metal strip edge of the second metal strip 4 and the earlier bottom regions of the trough-shape legs 2b.

Figure 3:
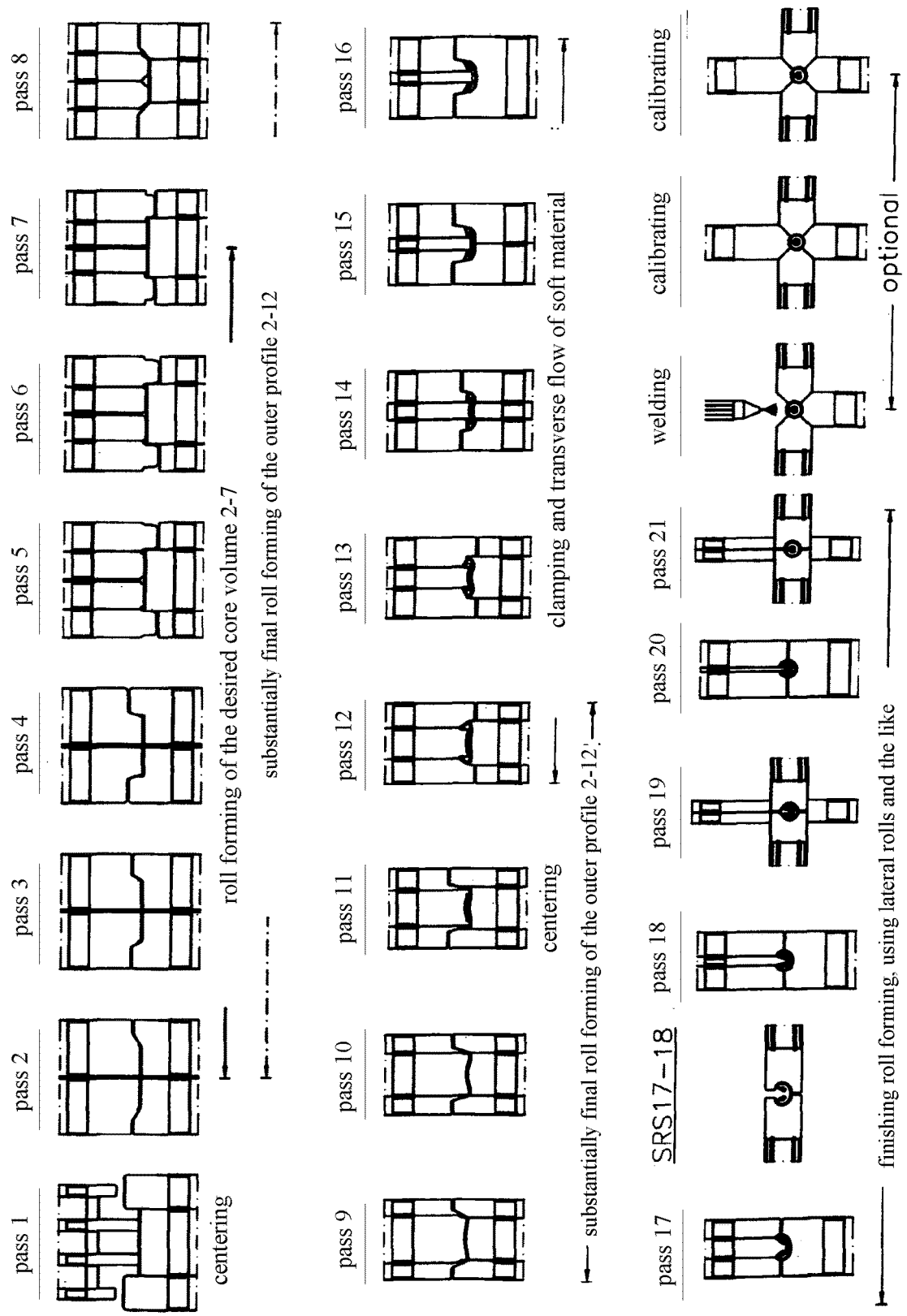
Figure 4:
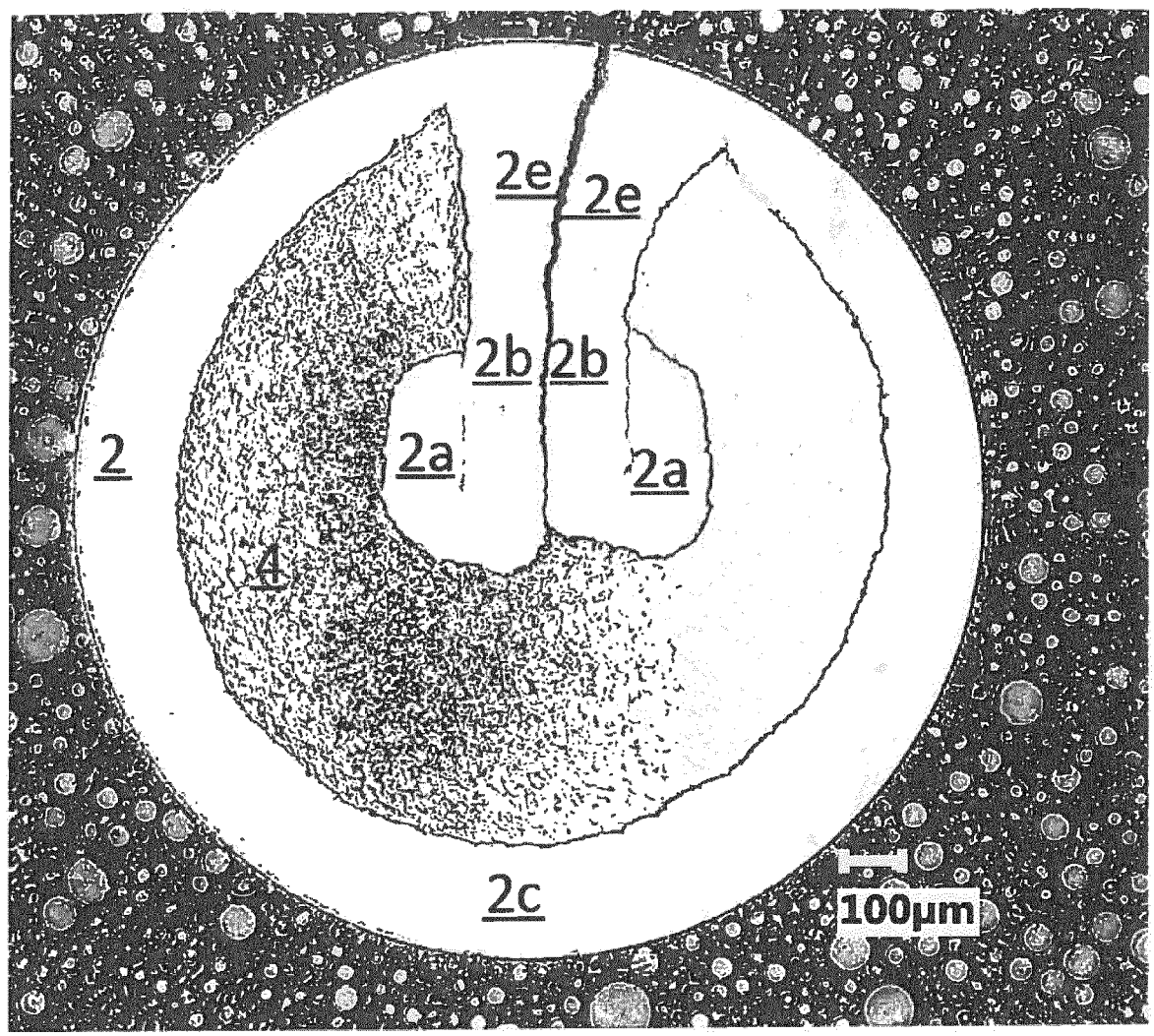

FIG. 3 shows the roller set used for roll forming. FIG. 4 shows the section through the cross-section of a composite wire having a diameter of 1.6 mm.

Exemplary Embodiment

Producing an NiAl wire from strips, instead of an alloy produced by fusion metallurgy, has the advantage that the exothermic effect during melting of the aluminum results in better adhesion of the sprayed alloy. Compared to the introduction of the aluminum in powder form, it is advantageous that fewer oxides are incorporated.

Material Grades

A nickel strip was used, having a degree of purity of 99.98 wt. % and a C content of 0.002 wt. %. The grade EN AW 1050A was used as the aluminum strip.

Strip Dimensions

A plurality of dimensional variants are conceivable, and it must be taken into consideration that changes in the thickness also result in changes in the width. Due to the fixed widths of the Ni and Al strips used, which in this example result from the rolling motion and are 58 mm and 24 mm, respectively, and due to the predefined surface area distribution Al/Ni=45.21%/54.79% for the preferred application as a thermal spray wire, the thickness of the nickel strip results as 1.2 mm, and that of the aluminum strip as 2.40 mm.

Review:

| Metal | Width mm | Thickness mm | Surface abs., in mm² | in % |
|---|---|---|---|---|
| Ni | 58.0 | 1.2 | 69.6 | 54.72 |
| Al | 24.0 | 2.4 | 57.2 | 45.28 |
|  |  |  |  | 100.00 |

Roll Forming

During the production of the feedstock wire by a roll forming process, the procedure is as follows at the individual roll forming steps to avoid a disproportionate elongation of the metal having the lower yield point. For the individual passes, refer to FIG. 2:

| Passes | Procedure |
|---|---|
| 2 to 7 | Defined production of the desired core volume of the later composite wire prior to bringing the two materials together by roll forming. For this purpose, the strip edge is folded over 180 degrees onto itself in these passes, and is thereby doubled. First, the nickel strip is separately roll formed as much as possible into the target geometry thereof. |
| 8 to 12 | Essentially final production of the target geometry of the harder material (here: Ni) prior to feeding the softer material (here: Al) so as to treat the geometry thereof with care, and to avoid elongation in the roll forming direction. In passes 8 to 10, the legs are vertically positioned, and thus the trough shape is formed, here having a W-shaped bulge. Starting with pass 11, the Al strip is inwardly deformed in a convex manner with little pressure over the convex nickel strip. For this purpose, the temporary inward W deformation is used. |
| 13 and 14 | Immediate clamping of the softer material after centric feeding, by placing on the folded-over strip edges of the harder material. Without direct roll pressure applied to the softer material, disadvantageous elongation due to the material being rolled out is avoided. |
| 13 to 16 | Creation of a coherent bond for generating the strip guidances between the workpieces/materials. Filling the lateral cavities by blocking longitudinal forces and enabling transverse forces. The forming step of the convex strip into a concave strip in pass 15 is carried out by lateral rolls. Only a retaining force is applied in the profile. |
| 16 to 21 | Vertically positioning the composite tube sides, in particular by way of lateral rolls (refer to SRS 17-18 in FIG. 3), so that a pressure application on the inner soft strip is minimized. Avoidance of longitudinal forces, thus no elongation of the soft strip. Using roll forming and calibration, a feedstock wire having a diameter of 14 mm in the width and 13 mm in the height is produced. The cross-section is not yet completely filled. After the calibration and reduction to 12 mm, the consolidation is completed |

According to these specifications, the design of the roll cross-sections was supported by the software "Copra RF2015 (Service Release 3)" from data M Sheet Metal Solutions GmbH, Am Marschallfeld 17, D-83626 Oberlaindern/Valley. Profiling was carried out by way of a Dreistern P120 machine comprising 21 deforming stations.

At the exit of the roll forming section, the feedstock wire is coiled to form an endless wire.

Initially, a feedstock wire composite having a slightly oval outside diameter, 14 mm wide and 13 mm high, had been generated during roll forming, due to a lack of stability of the stands that were used. Through the use of stands that are designed to be more stable, or through additional calibration passes, the profile can be completely inwardly rounded and the diameter thereof reduced.

After the nickel strip thickness was remeasured, it was found that the roll forming does not decrease the thickness of the, now roll formed, nickel strip; rather, minor thickening occurs.

In order to reduce the feedstock wire to the standard dimensions of thermal spray wires, several reduction steps are required in the case of a feedstock wire diameter of 13/14 mm. The feedstock wire can be reduced by further roll forming steps, rolling, drawing, stretching and hammering.

Further Roll Forming to Reduce the Cross-Section

Since process annealing is not required after the feedstock wire has been produced, the further cross-sectional reduction can be carried out in one operation with the roll forming (in-line). Additional deforming stations, which are not shown in FIGS. 1 and 2, are then required. On the other hand, a separate operation is saved, as it is described hereafter.

Rolling and Coiling Using a Drawing Operation

Ovality of the feedstock wire proves to be advantageous when the cross-section is to be reduced by rolling. Wire roll stands are composed of alternately horizontally and vertically oriented roll stands, which alternately roll an oval or round cross-section. Rolling oval shapes avoids the formation of burrs.

The feedstock wire having a diameter of 13/14 mm produced according to the invention was first reduced to 10 mm by a 6-stand Fuhr roll stand of the type W10-3. Downstream of the roll stand was a Herborn bull block EG IV, by way of which the wire was reduced to 8 mm, while also being coiled.

During the reduction by hammering, microcracks already occur on the inner side of the outer jacket with a deformation (without process annealing) of 70% (surface area-based).

Recrystallization Annealing

Even though the hardness of materials used is increased by the roll forming process, it is not to such an extent that deformability would be exhausted. Recrystallization annealing immediately after roll forming the feedstock wire is therefore not required. Rather, the roll-formed feedstock wire can, as described above in 4. and 5., be further reduced to 8 mm.

The coil, having a diameter of 8 mm, removed from the Herborn machine underwent recrystallization annealing at 450° C., with a holding period of 1 hour, under protective gas (argon with 10% hydrogen).

Recrystallization annealing does not cause the layers to be fused together. On the one hand, no mixed crystal formation thus occurs, and on the other hand, the layers are also not bonded by mixed crystal formation. Nonetheless, during further processing, the previously encountered problem of differing elongations of the bonded materials can be largely ignored since the frictional resistance in the wire, based on the cross-section, increases with decreasing thickness and increasing length of the wire.

Drawing and Final Annealing

After annealing, the wire has to be reduced to the standard dimensions of thermal spray wires, this being 3.2 and 1.6 mm.

Drawing tests have shown that the deformability of the nickel and the aluminum is exceeded at a deformation of >85% of the surface area cross-section. Initially, cracks develop on the inner side of the nickel jacket. If the deformability of the composite wire is exceeded, the former nickel strip edges, which are only supported on one side, folded in and doubled, tear first; they tear sooner than the jacket. With further deformation, the aluminum layer in the composite finally tears. This can be established based on indentations in the wire.

As a result of tearing of the nickel webs and the aluminum insert, the composition of the cross-section changes in an uncontrolled manner.

In a drawing machine comprising 8 stations, the wire was drawn from 8 mm to 3.53 mm, with a reduction per pull of 18.5%.

The overall deformation is 80.5%. At a diameter of 3.53 mm, the wire was annealed at 450° C. with a one-hour holding period.

An intermetallic phase did not develop either during the second annealing process at these annealing parameters. If the formation of an intermetallic phase is desired, a minimum holding period of 3 hours must be adhered to, at an annealing temperature of 450° C.

The final dimensions of 3.2 and 1.6 mm are achieved with one and/or five pulls:

After one pull, the wire is relatively soft, due to the minor deformation thereof, and easy to feed in cable-hose assemblies.

The overall deformation at a reduction to a diameter of 1.6 mm (see FIG. 4) is 79.5%. Even though the wire is hard, it can be fed through cable-hose assemblies due to the small diameter.

The invention claimed is:

1. A method for producing a feedstock wire, comprising roll forming a first metal strip of a first metal and at least one further metal strip of a second metal which is different from the first metal, wherein, first, exclusively only the first metal strip is formed to a preliminary shape in a plurality of passes using a first group of roll stands and, thereafter, the first metal strip and the at least one further metal strip are jointly formed to a final shape in a second group of roll stands, in the final shape a jacket formed from the first metal strip completely surrounding a core formed from the at least one further metal strip, wherein the preliminary shape of the first metal strip is a trough shape seen in a cross-section perpendicular to a longitudinal direction of the metal strip, the cross-section having lateral upright legs forming lateral outer walls of the trough shape and a bottom connecting the lateral upright legs to form a bottom of the trough shape, the jointly forming comprises inserting the at least one further metal strip into the interior of the trough shape in contact with the bottom of the trough shape, and clamping the inserted at least one further metal strip onto the first metal strip by the use of the second group of roll stands, and wherein the forming of the first metal strip into the trough shape comprises the following forming steps:

a. crimping each of both mutually opposing longitudinal edges of the first metal strip by 180 degrees onto a surface of the first metal strip; and b. forming the lateral outer walls of the trough shape connected by the bottom of the trough shape by bending each of two mutually opposed lateral regions of the first metal strip by 90 degrees plus/minus 15 degrees out of an initial plane of the first metal strip plan.

2. The method according to claim 1, wherein a convex bulge directed into the interior of the trough shape is inwardly deformed into the bottom of the trough shape thereby forming a W-shaped trough shape.

3. The method according to claim 2, wherein the at least one further metal strip is bent over the convex bulge.

4. The method according to claim 1, further comprising folding the lateral outer walls of the trough shape inwardly onto the surface of the inserted at least one further metal strip so that the inserted at least one further metal strip is clamped by the crimped edges of the first metal strip.

5. The method according to claim 1, further comprising bringing outer surfaces of the lateral outer walls of the trough shape in contact with one another in a plurality of passes, by concave inward-deformation with circular bending of the bottom of the trough shape relative to the trough shape interior so that the inserted at least one further metal strip is clamped between the bottom and the lateral outer walls of the trough shape.

6. The method according to claim 1, wherein each of the metal strips is unwound from a respective coil, and the feedstock wire is wound to form a coil.

7. The method according to claim 1, further comprising subjecting the feedstock wire to recrystallization annealing after a calibration and/or reduction of a cross-section of the feedstock wire.

8. The method according to claim 1, wherein one of the following metal pairings is selected for the first metal strip and the at least one further metal strip:
   a. an austenitic stainless steel and a ferritic stainless steel, or
   b. a ferritic stainless steel and aluminum or an aluminum alloy, or
   c. iron, steel or ferritic stainless steel, and nickel and aluminum whereby the feedstock wire is made of FeNiCrAl and FeNiAl.

9. The method according to claim 2, wherein the at least one further metal strip inserted in the trough shape and in contact with the bottom of the trough shape is centered with respect to the bottom of the trough shape.

10. The method according to claim 9, wherein a width of the at least one further metal strip is dimensioned so that respective clearances, which are adapted to be closed through material flow, is created between the respective opposed longitudinal edges of the at least one further metal strip and the lower end of the respective outer lateral walls of the trough shape.

11. The method according to claim 1, wherein the first metal strip comprises a metal having a higher yield point compared to the yield point of the metal of the at least one further metal strip and the at least one further metal strip is a single further metal strip, the metal having the higher yield point is high-purity nickel having a degree of purity of Ni≥99.6 wt. % and a C content of ≤0.02 wt. %, and the metal having the lower yield point is aluminum or an aluminum alloy.

12. A method for producing high-temperature resistant coatings by flame spraying, high-velocity flame spraying, arc coating, or laser build-up welding, wherein a feedstock wire produced by the method of claim 1 and thereafter reduced in diameter is used as a filler wire or thermal spray wire.

13. A method for treating a metal melt by wire injection, wherein the wire is a feedstock wire produced by the method of claim 1.

14. A method for producing nickel aluminides, comprising melting a feedstock wire produced by the method of claim 1.

15. A method for producing a feedstock wire, comprising roll forming a first metal strip of a first metal and at least one further metal strip of a second metal which is different from the first metal, wherein, first, exclusively only the first metal strip is formed to a preliminary shape in a plurality of passes using a first group of roll stands and, thereafter, the first metal strip and the at least one further metal strip are jointly formed to a final shape in a second group of roll stands, in the final shape a jacket formed from the first metal strip completely surrounding a core formed from the at least one further metal strip wherein the preliminary shape of the first metal strip is a trough shape seen in a cross-section perpendicular to a longitudinal direction of the metal strip, a convex bulge directed into the interior of the trough shape being inwardly deformed into the bottom of the trough shape thereby forming a W-shaped trough shape, the cross-section having lateral legs forming lateral outer walls of the trough shape and a bottom connecting the lateral legs to form a bottom of the trough shape, the jointly forming comprises inserting the at least one further metal strip into the interior of the trough shape in contact with the bottom of the trough shape, and clamping the inserted at least one further metal strip onto the first metal strip by the use of the second group of roll stands.

16. The method according to claim 15, wherein the at least one further metal strip inserted in the trough shape and in contact with the bottom of the trough shape is centered with respect to the bottom of the trough shape.

17. The method according to claim 15, wherein the first metal strip comprises a metal having a higher yield point compared to the yield point of the metal of the at least one further metal strip.

18. The method according to claim 15, wherein a width of the at least one further metal strip is dimensioned so that respective clearances, which are adapted to be closed through material flow, is created between the respective opposed longitudinal edges of the at least one further metal strip and the lower end of the respective outer lateral walls of the trough shape.

19. The method according to claim 17, wherein the at least one further metal strip is a single further metal strip, the metal having the higher yield point is high-purity nickel having a degree of purity of Ni≥99.6 wt. % and a C content of ≤0.02 wt. %, and the metal having the lower yield point is aluminum or an aluminum alloy.

20. The method according to claim 15, wherein the first and second metals are different from one another in yield strength.

21. The method according to claim 15, wherein each of the metal strips is unwound from a respective coil, and the feedstock wire is wound to form a coil.

22. The method according to claim 15, further comprising subjecting the feedstock wire to recrystallization annealing after a calibration and/or reduction of a cross-section of the feedstock wire.

23. The method according to claim 15, wherein one of the following metal pairings is selected for the first metal strip and the at least one further metal strip:
   a. an austenitic stainless steel and a ferritic stainless steel, or
   b. a ferritic stainless steel and aluminum or an aluminum alloy, or
   c. iron, steel or ferritic stainless steel, and nickel and aluminum whereby the feedstock wire is made of FeNiCrAl and FeNiAl.

* * * * *